Figure 1:
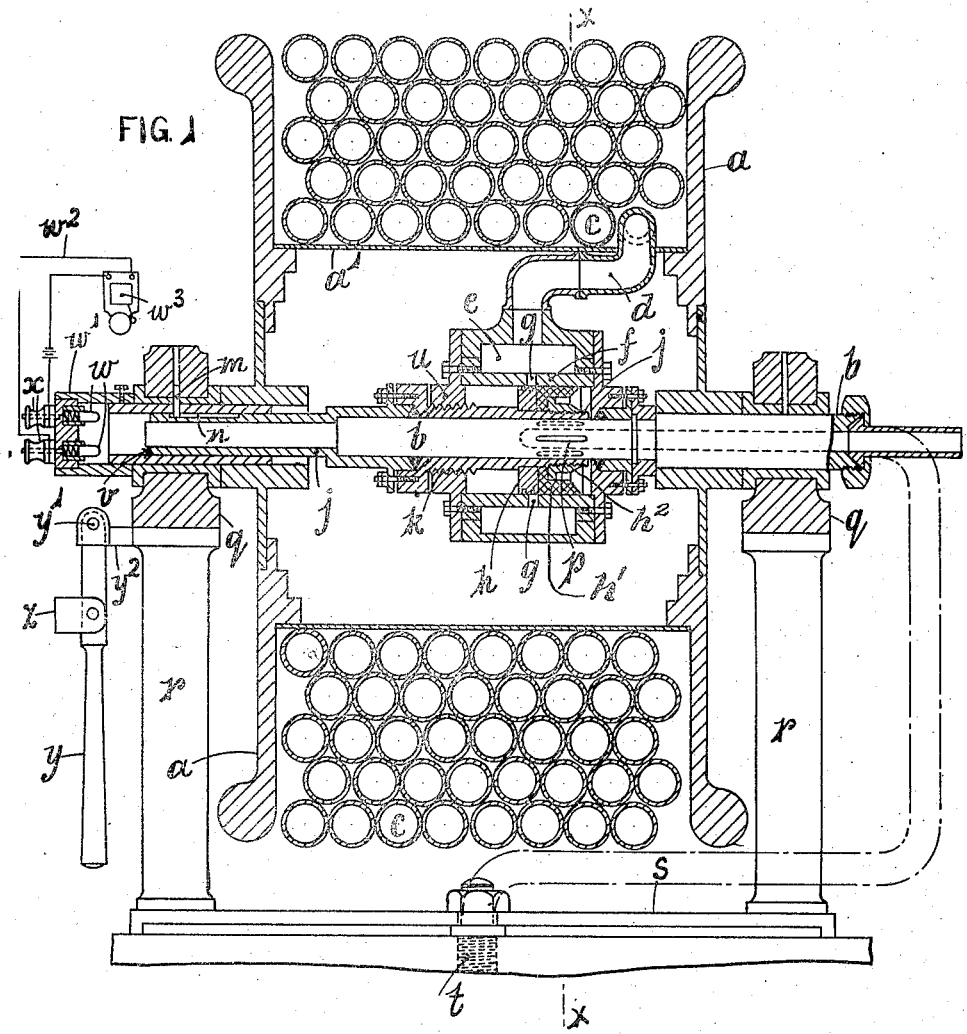

Dec. 28, 1926.

J. NICHOLSON 1,612,206

MEANS FOR SUPPORTING FLEXIBLE PIPES

Filed Jan. 5, 1925  2 Sheets-Sheet 1

INVENTOR
JOHN NICHOLSON,
By Toulmin & Toulmin
ATTORNEYS

Dec. 28, 1926. 1,612,206
J. NICHOLSON
MEANS FOR SUPPORTING FLEXIBLE PIPES
Filed Jan. 5, 1925  2 Sheets-Sheet 2

INVENTOR
JOHN NICHOLSON,
By Toulmin & Toulmin
ATTORNEYS

Patented Dec. 28, 1926.

1,612,206

UNITED STATES PATENT OFFICE.

JOHN NICHOLSON, OF CHESTER-LE-STREET, ENGLAND.

MEANS FOR SUPPORTING FLEXIBLE PIPES.

Application filed January 5, 1925, Serial No. 600, and in Great Britain January 10, 1924.

This invention relates to means for supporting flexible pipes, particularly the non-collapsible hose pipes used for fire extinguishing, though it may also be applied to non-collapsible flexible pipes for other purposes.

According to this invention, I coil the non-collapsible hose or other flexible pipe around a reel which is revolubly mounted on a branch pipe communicating with the water main, and I provide means whereby, when the hose is drawn off the reel, the consequent rotation of the reel automatically and instantaneously allows water at full pressure to pass from the branch pipe into the hose when a predetermined portion of the hose is unwound from the reel. By this arrangement, in case of fire, it is only necessary to seize the nozzle of the hose and pull the hose off the reel, water at full pressure flowing therethrough immediately the predetermined length of hose has been unwound from the reel. The length of hose to be unwound before water flows may be any portion of the coil, or the whole thereof, but will usually be only a short length. Preferably the unwinding of the hose is also utilized to close the circuit of an electrically-operated audible alarm which may be arranged adjacent to the hose reel or at a distance therefrom, and, where a plurality of hose reels are provided, an indicator may also be electrically operated to indicate the situation of the hose reel actuating the alarm. The circuit of a fire alarm outside the building or in a fire station may also be closed by the unwinding of the hose, but, to avoid calling out the fire brigade in the case of an easily extinguishable fire, it will preferably be arranged that the alarm in the fire station is actuated only when say three or more hoses are brought into operation, which would occur if the fire is serious. Where however there is only one reel of hose in the building, the outside alarm may be adapted to ring simultaneously with the alarm within the building. Preferably the alarm circuit will be one which is normally frequently in use, for example a door bell circuit or the lighting circuit so that failure of the circuit will be noticed and remedied before an emergency occurs. The fire alarm bell will be arranged to sound a distinctive warning.

While hose pipes mounted as above described are specially applicable to private dwellings, rooms, offices, shops, warehouses, factories, theatres, public halls and the like, they may also be applied to fire-engines for automatically effecting communication with the water supply when the hoses are uncoiled from their reels, and also for automatically effecting communication between the suction pipe of a pump and a water supply, for example, a hydrant; or they may be applied to passenger and cargo vessels in which case the closing of the electric circuit may be adapted to start the pumps supplying water to the branch pipes or to sound an alarm bell which would give the signal to start the pumps, or to both start the pumps and sound the alarm.

Figure 3:
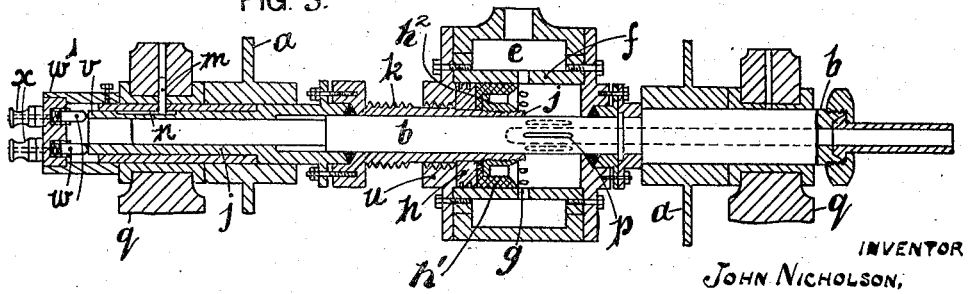
Figure 2:
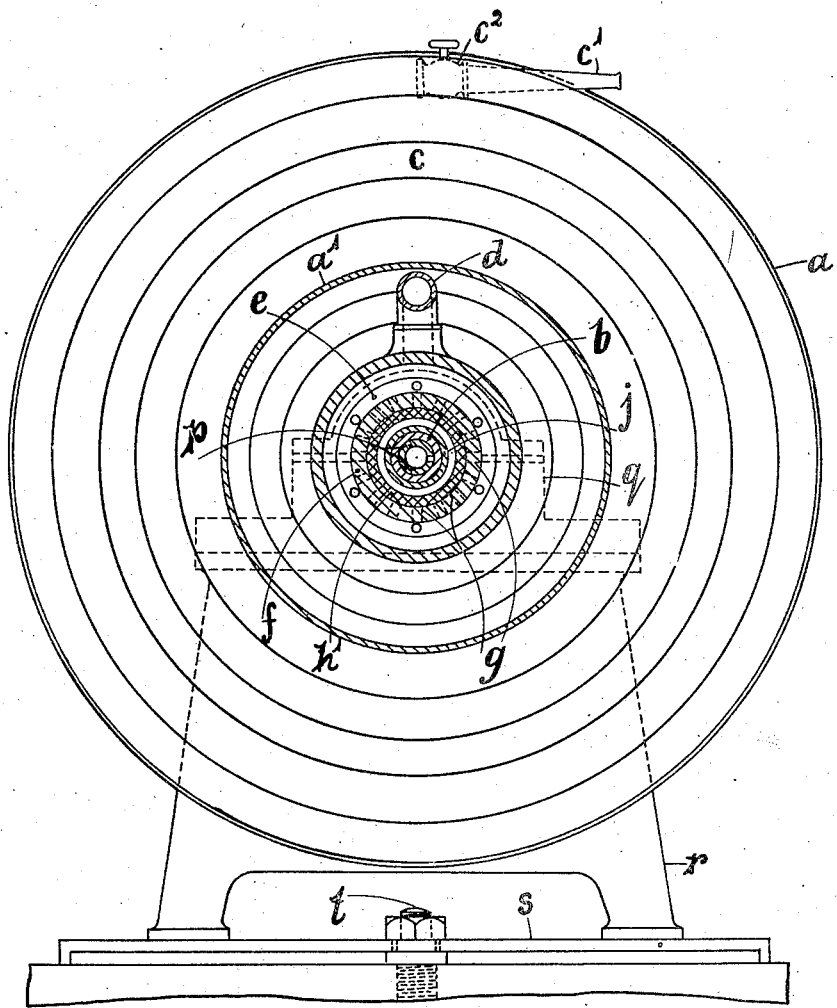

I will describe my invention with reference to the accompanying drawings which illustrate one construction according to my invention. In the drawings, Figure 1 is a central sectional elevation showing the parts in normal out-of-action position; Figure 2 is a section on the line X—X in Fig. 1; and Figure 3 is a part similar view to Fig. 1 showing the parts in the operative position.

Referring to the drawings, in the example of my invention therein illustrated, the hose reel $a$ is rotatably mounted on a branch pipe $b$, the inner end of the non-collapsible hose $c$ being permanently attached to a short spigot $d$ projecting radially from a central barrel $e$ within a steel drum $a^1$ which is provided to receive the first coil of hose. The barrel $e$ has an inner cylindrical wall $f$ in which is a ring of apertures $g$. Within the cylinder $f$ is disposed a piston $h$ which makes a water-tight joint with the inside of the cylinder, and is fixed on a sleeve $j$ which is a water-tight fit on the branch pipe $b$. Behind the piston is a leather washer $h^1$ secured by a threaded sleeve $h^2$. The sleeve $j$ is externally threaded at $k$ and is free to slide on the pipe $b$, but is prevented from rotating thereon by a pin $m$ engaging a keyway $n$. Spaced slots $p$ are provided in the branch pipe $b$, the pipe being solid beyond these slots. The hose reel $a$ on the branch pipe may conveniently be built into a recess in a wall with the nozzle $c^1$ of the hose $c$ projecting or otherwise arranged so as to be readily accessible. The branch pipe is supported by bearings $q$ supported by pillars $r$ on a base $s$ which may be rotatable on a centre pivot $t$ so that the reel can swivel in the direction in which the hose is pulled. The pivot $t$ may be hollow and form the connection to the water main, being connected to the branch pipe $b$ as indicated in dot-and-dash lines in Fig. 1.

The arrangement is such that, when the hose $c$ is coiled on the reel $a$, the piston $h$ and threaded sleeve $j$ close the holes $g$ and slots $p$, as shown in Figs. 1 and 2. As the hose is drawn off the reel, the latter and the barrel $e$ rotate and an internally-threaded cap $u$ on the barrel coacts with the threaded sleeve $j$ to slide the latter and its piston $h$ to the left. The axial travel of the sleeve and piston uncovers the slots $p$ in the branch pipe, and the water therein enters the cylinder $f$ behind the piston. The number of threads on the sleeve $j$ is made equal to the number of coils of hose to be unwound from the reel $a$ before the water from the main is admitted to the hose, and, as the last thread is leaving the cap $u$, the sleeve $j$ disengages said cap, whereupon the water pressure behind the piston $h$ at once forces same to the left-hand end of the cylinder $f$ thus uncovering the apertures $g$ therein and in an instant opening up communication between the branch pipe $b$ and the spigot $d$ to which the inner end of the hose $c$ is attached, as shown in Fig. 3 so that water under full pressure is admitted to the hose. Simultaneously the end $v$ of the sleeve $j$ remote from the piston $h$ makes contact with a pair of contact pieces $w$ and completes an electric circuit $w^2$ connected to the terminals $x$. The electric circuit $w^2$ may be that of an electric alarm bell $w^3$, or of an indicator, or of a starting switch of a pump, or of other well known electrically-operated device or devices, as will be readily understood without illustration. It will be noticed that the electric circuit is closed only when the full pressure in the water main has been admitted to the hose.

The bore of the branch pipe $b$ will be of size designed to suit the bore of the hose to be used therewith.

A valve $c^2$ will preferably be fitted in the nozzle $c^1$ of the hose to control the issue of water from the nozzle after the hose has been automatically put into communication with the branch pipe, the hose in this case standing full of water; said water is not however under pressure until the hose is put into communication with the branch pipe $b$.

It will be seen that the length of hose to be unwound from the reel before water is admitted to the hose is determined by the number of threads on the sleeve $j$ or in the cap $u$, and, by varying the number of said threads, the device can be readily arranged to admit water to the hose when any portion of, or not until the whole of, the hose has been unwound from the reel.

To return the sleeve $j$ and piston $h$ to initial position after the hose has been used, the water in the main is turned off to relieve the pressure on the piston and hose, the hose is recoiled on the reel until only the length to be unwound before water is admitted remains, and the sleeve is slidden to the right to re-engage its thread with the cap $u$ by means of the handle $y$ (Fig. 1) which is pivoted at $y^1$ on a bracket $y^2$ carried by the pillar $r$, said handle having a cup $z$ adapted, when the cap $w^1$ carrying the contacts $w$ and terminals $x$ is removed and the handle is swung on its pivot, to engage the end $v$ of the sleeve and re-engage its thread with that of the cap $u$. The remainder of the hose is then wound onto the reel by revolving the reel, which action screws the sleeve in to the cap $u$ and so returns it and the piston $h$ to initial position. The water in the main is then turned on again.

What I claim and desire to secure by Letters Patent is:—

1. Means for supporting non-collapsible flexible pipes comprising a branch pipe communicating with the water main, a hose reel revolubly mounted on said branch pipe, a barrel on said branch pipe within said reel, said barrel forming a portion of the water conduit connecting said branch pipe and the inner end of the hose on said reel, a piston valve in said barrel normally closing said conduit, and means whereby, on rotation of the reel by drawing the hose thereoff, water is admitted from said branch pipe into said barrel behind said piston valve which is thereby moved to instantly fully open said conduit, when a predetermined portion of the hose has been unwound from the reel, and immediately allow water at full pressure to pass from said branch pipe into the hose.

2. Means for supporting non-collapsible flexible pipes comprising a branch pipe communicating with the water main, a hose reel revolubly mounted on said branch pipe, a barrel on said branch pipe within said reel, said barrel forming a portion of the water conduit connecting said branch pipe and the inner end of the hose on said reel and rotating with said reel, a non-rotatable sleeve on said branch pipe, a piston valve on said sleeve within said barrel, a threaded cap on said barrel engaging said sleeve which is threaded to correspond, said piston normally closing a communication between said branch pipe and said barrel but being slidden axially by the co-action of said sleeve and said cap due to rotation of the reel as the hose is drawn thereoff, to gradually open said communication and admit water from the branch pipe into said barrel behind said piston valve, ports in said barrel leading to the inner end of the hose also closed by said piston valve until the rotation of the reel disengages said cap from said sleeve when a predetermined portion of the hose has been unwound from the reel whereupon said valve is moved by the water pressure behind it to instantly fully uncover said ports and immediately allow water at full pressure to pass from said branch pipe through said barrel into said hose.

In testimony whereof I have signed my name to this specification.

JOHN NICHOLSON.